Dec. 23, 1969           J. R. GRANAN ETAL           3,485,140
          ALL-HYDRAULIC CONTROL SYSTEM RESPONSIVE TO
                  ELECTRICAL COMMAND SIGNALS
                     Filed Oct. 6, 1966
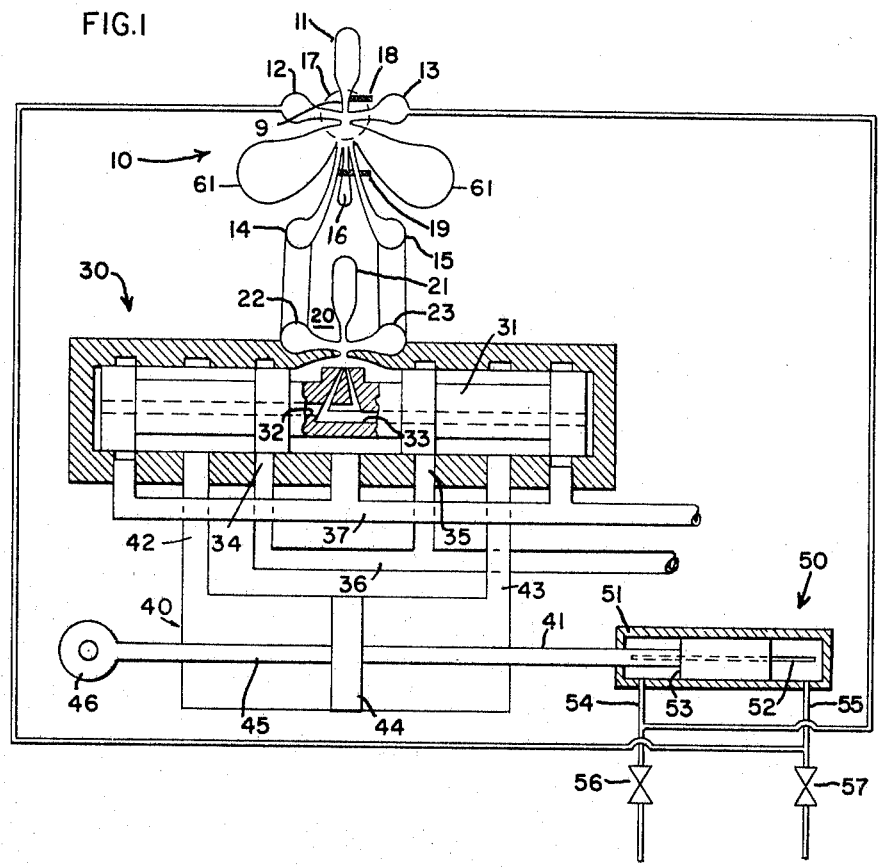
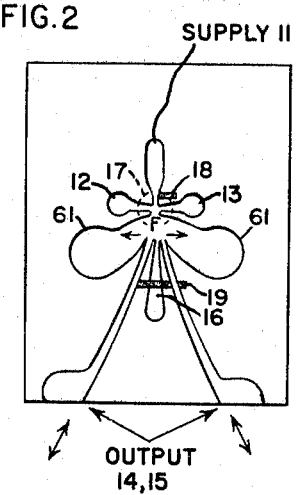

United States Patent Office 3,485,140
Patented Dec. 23, 1969

3,485,140
ALL-HYDRAULIC CONTROL SYSTEM RESPONSIVE TO ELECTRICAL COMMAND SIGNALS
John R. Granan, Scotia, and Robert C. Kumpitsch, Johnstown, N.Y., assignors to General Electric Company, a corporation of New York
Filed Oct. 6, 1966, Ser. No. 584,866
Int. Cl. F15b *13/16;* F15c *1/08*
U.S. Cl. 91—388                                   4 Claims

ABSTRACT OF THE DISCLOSURE

A hydraulic control system for a hydraulic motor actuator which drives the motor responsive to an input electrical current and includes a mechanical-hydraulic position transducer to counteract the input command when the actuator position is a proper response to the input current. The first stage is a flueric device, i.e., a fluid device without moving parts other than the fluid medium, which uses the input electric current in a magnetic field to deflect a jet stream of conductive fluid to establish flows representing the input command and which accepts hydraulic pressure differentials from the transducer to counteract the electromagnetic stream deflection to stop the motor when the proper actuator position is obtained. A spool valve responsive to proportional flow deflections controls the motor.

---

This invention relates to electro-hydraulic servo systems using an electrically conducting fluid such as a liquid metal as the working fluid. It is particularly useful in applications such as flight control systems, in which the greatest possible reliability is desired. It is characterized by the exclusive use of hydraulic components, with the exception of the input control element which is responsive to electrical command signals.

Development of fluid logic devices for computing and control applications is presently receiving widespread attention. Projected uses range from high reliability, flight control systems to cycle programming in home appliances. Interest in fluid logic has been spurred by the inherent simplicity and reliability of the elements, the possibility of eliminating one or more steps of energy conversion, relative freedom from temperature and radiation effects, and low cost in quantity production.

In any discussion of fluid logic, stress is placed on the fact that certain devices have virtually no moving parts. While this is true if one considers only the logic module itself, the control jets, which are essential parts of the device, are usually regulated by mechanical valves. In those cases where the valves are operated by fluid signals, it might be said that both input and output are pneumatic or hydraulic, but this neglects the energy conversion often required to accept electric input information. The term "flueric" has come to mean a fluidic device in which only the fluid medium moves.

In practical control systems, present measuring instruments, data processing apparatus, etc. use electrical signals at least in part. On the other hand, sophisticated control systems of the best designs have turned in recent years more and more to hydraulic apparatus where substantial power output is involved. This results in a double conversion requirement; electrical inputs must be converted into a mechanical form for the output hydraulic stage and the mechanical output must be converted into a form compatible with the electromechanical input devices. This results in a very strong temptation to eliminate all electrical components, and a great deal of effort is being expended in this direction.

As to precision hydraulic power apparatus, most successful designs employ two stage servo valves, such as the classic first stage flapper-nozzle valve with a second stage spool valve controlling piston and cylinder output. This type of apparatus, however, presents feedback problems which tend to lead to performance uncertainty and insufficient system stability. For example care must be taken in the feedback to the first stage valve to avoid undue system sensitivity to input noise and mechanical feedback from the output actuator is subject to mechanical temperature distortion effects and flexibility of structure.

Accordingly, it is an object of the invention to provide a control system having performance characteristics comparable with or better than present systems but substantially without the reliability risks inherent in moving parts.

It is a further object to provide a control system suitable for extreme temperature and radiation environments.

Briefly stated, a novel control system is provided which is a combination of flueric devices, that is, having no moving parts other than the fluid medium, and of conventional apparatus. An input stage is provided which utilizes a novel flueric device that permits the application of both electrical and hydraulic control signals in a unitary construction. A second stage hydraulic valve is provided which is directly compatible with the input flueric device and which incorporates a hydraulic feedback mechanism having high gain and inherent high reliability. Position of the controlled load is sensed and fed back to the servo valve by a novel hydraulic mechanism which eliminates all electrical or moving mechanical connections. It has been found that the use of the minimum number of moving parts makes precision performance practical without sacrificing reliability.

The invention, together with further objects and advantages thereof, may best be understood by referring to the following description taken in conjunction with the appended drawings in which like numerals indicate like parts and in which:

FIGURE 1 is a schematic diagram of a preferred embodiment of the invention.

FIGURES 2 and 3 are front and side elevation views, respectively, of the input logic device portion of the FIGURE 1 system.

The control system of FIGURE 1 is comprised of an input flueric logic device 10, receiving an electrical input signal and a hydraulic feedback signal; a second flueric logic device 20; a spool valve 30 as a second stage hydraulic device; a linear actuator 40, and a hydraulic bridge 50 for generating feedback signals to logic device 10. In the flueric logic device 10, 11 is the inlet for electrically conducting fluid under pressure to supply a power jet 9, 12 and 13 are feedback control jets, 14 and 15 are outlet ports, and 16 is the principal drain connection. A permanent magnet is installed with the pole pieces 17 and 17' oriented so that the flux between the opposing poles is in a direction perpendicular to the drawing in FIGURE 1. Electrodes 18 and 19 in contact with the fluid in the inlet and outlet ports allow current to flow through fluid in the main jet. When current flows between electrodes 18 and 19, the fluid jet in the magnetic field experiences a deflecting force, in accordance with Ampere's law, and an increased flow occurs into either output port 14 or 15, depending on the current and magnetic polarity. The main jet is therefore deflected in a direction governed by the current polarity, and in an amount determined by the magnitude of the current. Bulbous conduits 61 are common in the art as a means for removing the Coanda effect and assist in preventing a flip-flop action. These bulbous areas have connections to drain, not shown, which prevent the build-up of back pressure.

Control of the spool-type power stage 30 is accomplished by a second integral analog fluid logic device 20, responsive to device 10. In this device 21 is the fluid pressure inlet for the power jet, and the flow of fluid from ducts 22 and 23 as determined by previous deflection of jet 9 into either 14 or 15, constitutes control jets to deflect the power jet from 21. While the control system of FIGURE 1 shows two flueric elements in series, it is understood that any number may be used, depending upon the degree of hydraulic amplification required to operate spool valve 30. The spool 31 of the power stage 30 has two receiver ports 32 and 33 at the center. If the output of the terminal logic device 20 is centered, the flow divides equally and is converted to equal pressures on each end of the spool. Thus, the spool 31 remains centered in the absence of an input signal.

When an electrical signal is impressed, the first flueric device 10 jet deflects, causing a corresponding deflection of the jet of the second device 20. This directs more flow into one of the spool receiver ports 32 or 33 and results in unbalanced pressures across the spool 31 to move the spool 31 sufficiently to open one of the two hydraulic pressure ports 34 or 35. Centering the deflected jet serves to move the spool in the opposite direction until the spool is again centered. Thus, the spool motion is equal to the second element jet deflection, and interaction between spool and jet is accomplished hydraulically, eliminating springs or mechanical connections. Tube 36 is the hydraulic pressure supply; 37 a drain tube.

An electrical input signal to logic device 10 moves the spool 31 a distance proportional to the signal and ports fluid into the linear actuator 40. Linear actuator 40 is a two chamber hydraulic motor having a reciprocating piston 44 carrying piston rod 41 and actuator rod 45 which has pin receiver 46 for connection to a driven element. Hydraulic fluid access is through conduits 42 and 43. Attached to the piston rod 41 and thereby linked for movement with actuator rod 45 is the hydraulic feedback device 50. This unit 50 is a hydraulic position transducer for transposing motor position to hydraulic pressures and includes a long cylinder 51 closed at both ends and having a very narrow longitudinal slot 52 extending over the full operating length of the cylinder. A close-fitting piston 53 in the cylinder covers a section of the slot. Discharge from the slot spills over and returns to drain via a system not shown, the details of which are immaterial to the invention.

Two pressure lines 54 and 55 under the same head enter the cylinder 51, one at each end. Each line has an identical fixed orifice 56, 57 so that when the piston is centered and equal segments of the slot are uncovered at each end, fluid flow through the orifices 56, 57 and out of the slot segments to drain produces equal pressure drops. Hence, flows at equal pressure are fed back to the control jets 12 and 13, and have no net effect on the main power jet 9.

If an electrical signal is now introduced, deflecting the main power jet 9 to port 15, for example, the power jet 21 is deflected to the left as shown in FIGURE 1 and the valve spool 31 also moves to the left. This ports fluid from port 35 into the right side of actuator 40, driving piston 44 to the left. Since the piston rod 41 is connected to the movable piston 53 of feedback transducer 50, the effect of the motion is to shorten the left slot segment and lengthen the right one. Thus, pressure in the left-hand end of the feedback cylinder 51 rises and that in the right-hand end drops. This differential pressure is transmitted to control jet 12 and 13 as a proportional measurement of the relative position of piston 44. Since the higher pressure is in jet 13, the control jet forces the main power jet 9 back towards center gainst the electrical signal. When the main power jet is centered, the second stage spool valve 30 closes locking piston 44 and consequently transducer piston 53 in place. This also locks the element controlled since normally the principal actuator, as an aircraft control surface actuator, is attached to actuator piston 44, as by an actuator rod 45. Removal of the electrical signal again unbalances the fluid forces and the load will move until the piston 53 is again centered.

FIGURES 2 and 3 show further details of the construction of the logic device 10 in FIGURE 1. This flueric device operates with an electrically conducting fluid (such as the eutectic alloy of sodium and potassium known as NaK–77. Device 10, with the exception of magnet 17 and electrodes 18 and 19, is made of an insulating material such as plastic or glass for low temperature applications and fused alumina for high temperature. The permanent C-shaped magnet having poles 17 and 17' typically has faces on those poles of approximately $\frac{5}{32}''$ in diameter, separated by $\frac{1}{16}$ of an inch, with a field strength of 8000 gauss. With an inlet pressure of 5 p.s.i.g., input currents of ±3 amps at a voltage level of 30 millivolts can produce an output pressure difference of ±1.7 p.s.i.g. The use of a second fluid logic device 20 permits the use of a higher pressure jet to operate spool valve 30 while using lower pressures in device 10.

The only moving parts in the FIGURE 1 system are the spool 31, piston rod 41 and elements attached thereto so that the remainder of the system is truly flueric. With the self-centering action of the spool resulting from the receiver port configuration and the inherent reliability of the power piston, extraordinary reliability for the system is assured.

The jets 12 and 13 actually perform two functions. In addition to serving as feedback inputs, they permit submerged jet deflection by allowing cross flow between 12 and 13 for all attitudes of the apparatus without use of a bypass loop. This second function has been found necessary for the magnetic deflection in flueric device 10 in non-vertical attitudes. The use of both flueric devices and a spool-valve makes efficient flueric device operation far easier to obtain because the spool-valve provides full shut-off condition.

While particular embodiments of the invention have been shown and described herein, it is not intended that the invention be limited to such disclosure, but that changes and modifications can be made and incorporated within the scope of the claims.

What is claimed is:
1. A servo actuator comprising:
 (a) a flueric logic device including a power jet of electrically conducting fluid, a pair of spaced electrodes for applying a control current through said power jet, a magnet which provides a magnetic field through said power jet, and a pair of fluid control jets for deflecting said power jet;
 (b) a spool-valve, and means whereby said spool-valve is controlled by said flueric logic device;
 (c) a hydraulic motor actuator, and means whereby said hydraulic motor is controlled by said spool valve;
 (d) a hydraulic position transducer, mounted on said actuator, and means for providing position feedback signals by means of fluid pressure to said control jets in said flueric logic device responsive to the position of said actuator.
2. A hydraulic system comprising:
 (a) a first flueric device including,
  (1) a first power jet of electrically conductive liquid under pressure,
  (2) a pair of outlets arranged to receive said first power jet,
  (3) a magnet arranged to produce a magnetic field through said first power jet,
  (4) a pair of spaced electrodes in contact with said liquid for applying a variable input current through the said liquid passing through said jet to cause said liquid to be electrically charged while passing through said magnetic field to provide an electromagnetic deflection force for selectively driving said jet towards one of said outlets,
  (5) a first pair of control jets for providing hydraulic deflection forces for said first power jet in opposition to said electromagnetic deflection force;
(b) a second flueric device having a second power jet and a second pair of control jets connected to the outlets of the said first flueric device for providing hydraulic deflection forces to said second power jet responsive to the output of said first flueric device;
(c) a linear hydraulic motor actuator having a mechanical output means;
(d) a spool valve responsive to said second power jet and the deflections thereof caused by said second pair of control jets and controlling said hydraulic motor, said spool valve having a neutral position which is assumed under conditions of equal influence from each of the jets of said second pair of control jets, said spool valve when in said neutral position interdicting hydraulic flow to said motor to lock said motor in place; and
(e) a hydraulic position transducer means providing hydraulic feedback signals to said first pair of control jets of the said first flueric device in the form of a pressure differential proportional to the position of said mechanical output means.

3. The hydraulic system of claim 2 wherein said hydraulic position transducer means includes a pair of fixed orifices for supplying two identical constant pressures, a pair of variable orifices fed by said fixed orifices for creating a pressure differential proportional to variations of said variable orifices and mechanical means linked to said mechanical output means of said actuator for varying said variable orifices proportionally, responsive to position of said output means.

4. A hydraulic control system for an actuator comprising:
(a) a flueric device for producing a first jet stream of fluid including electromagnetic means responsive to a variable electric current for deflecting said stream at variable rates into a plurality of output ports and including first fluid control jet means responsive to a differential hydraulic pressure for deflecting said stream in opposition to or in support of deflection caused by said electromagnetic means;
(b) a flueric amplifier for producing a second jet stream of fluid including second fluid control jet means responsive to rates of flow in said output ports for deflecting said second pet stream proportionally to deflection of said first jet stream;
(c) a hydraulic motor including an actuator rod;
(d) a moving mechanical valve controlling fluid to said hydraulic motor and having positions for starting, reversing and locking said hydraulic motor, said valve having receiver ports located in the path of said second jet stream and being movable among said positions responsive to deflections of said second jet stream; and
(e) feedback means mounted for movement with said actuator rod to create a differential hydraulic pressure proportional to the position of said actuator rod and to convey said pressure to said first fluid control jet means whereby movement of said motor and actuator rod in response to variations in said current will cause said feedback means to cause said first fluid control jet means to counteract said electromagnetic means to stop and lock said motor in place.

References Cited
UNITED STATES PATENTS

| | | | |
|---|---|---|---|
| 3,071,154 | 1/1963 | Cargill et al. | 137—81.5 X |
| 3,081,787 | 3/1963 | Meulendyk | 91—3 X |
| 3,258,685 | 6/1966 | Horton | 137—81.5 X |
| 3,263,695 | 8/1966 | Scudder et al. | 137—81.5 |
| 3,266,514 | 8/1966 | Brooks | 137—81.5 |
| 3,282,283 | 9/1966 | Takeda | 91—3 X |
| 3,348,773 | 10/1967 | Ahern | 137—81.5 |

CARROLL B. DORITY, Jr., Primary Examiner

U.S. Cl. X.R.

137—81.5